United States Patent
Ho et al.

(10) Patent No.: US 9,625,579 B2
(45) Date of Patent: Apr. 18, 2017

(54) INTERFERENCE SYSTEM AND COMPUTER SYSTEM THEREOF FOR ROBOT CLEANER

(71) Applicant: Wistron Corporation, New Taipei (TW)

(72) Inventors: Mang-Chia Ho, New Taipei (TW); Jia-Cyuan Fan, New Taipei (TW); Chi-Hsiang Yeh, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/531,976

(22) Filed: Nov. 3, 2014

(65) Prior Publication Data

US 2016/0039095 A1 Feb. 11, 2016

(30) Foreign Application Priority Data

Aug. 11, 2014 (TW) .............................. 103127524 A

(51) Int. Cl.
*B25J 9/16* (2006.01)
*B25J 11/00* (2006.01)
(Continued)

(52) U.S. Cl.
CPC .......... *G01S 15/931* (2013.01); *G01S 17/936* (2013.01); *G05D 1/0022* (2013.01);
(Continued)

(58) Field of Classification Search
CPC .... B25J 11/0085; B25J 9/1694; B25J 19/021; B25J 19/026; G01S 15/931; G01S 17/936;
(Continued)

(56) References Cited

U.S. PATENT DOCUMENTS

| | | | | |
|---|---|---|---|---|
| 5,652,489 A | * | 7/1997 | Kawakami | G05D 1/0242 318/568.12 |
| 2003/0120389 A1 | * | 6/2003 | Abramson | A47L 5/22 700/245 |

(Continued)

FOREIGN PATENT DOCUMENTS

| | | |
|---|---|---|
| TW | M477595 U | 5/2014 |
| TW | 201430368 A | 8/2014 |

OTHER PUBLICATIONS

Office action mailed/issued on Jun. 28, 2016 for TW application No. 103127524, filing date: Aug. 11, 2014, pp. 3-8, and p. 9 line 1-4.

*Primary Examiner* — Khoi Tran
*Assistant Examiner* — Robert Nguyen
(74) *Attorney, Agent, or Firm* — Winston Hsu; Scott Margo

(57) ABSTRACT

An interference system for a robot cleaner which generates a detection signal and receives a feedback signal corresponding to the detection signal is disclosed. The interference system includes a fixing module, for stably fixing the interference system onto the robot cleaner; a monitor module, for obtaining a real-time imaging information of the robot cleaner; a transmission module, for transmitting the real-time imaging information to a computer system and correspondingly receiving a control signal from the computer system; and an interference module, coupled to the fixing module, for reflecting the detection signal to be the feedback signal according to the control signal, so as to process an interference operation to change a moving direction of the robot cleaner.

16 Claims, 10 Drawing Sheets

(51) Int. Cl.
*G01S 15/93* (2006.01)
*G01S 17/93* (2006.01)
*G05D 1/00* (2006.01)
*G05D 1/02* (2006.01)

(52) U.S. Cl.
CPC ........ *G05D 1/0246* (2013.01); *A47L 2201/04* (2013.01); *G05D 2201/0203* (2013.01); *Y10S 901/01* (2013.01); *Y10S 901/09* (2013.01)

(58) Field of Classification Search
CPC ... Y10S 901/01; Y10S 901/09; G05D 1/0022; G05D 1/0246; G05D 2201/0203; A47L 2201/04
USPC .......................................... 700/253; 901/1, 9
See application file for complete search history.

(56) References Cited

U.S. PATENT DOCUMENTS

| | | | | |
|---|---|---|---|---|
| 2004/0158357 A1* | 8/2004 | Lee | ................... | B60L 11/1833 700/258 |
| 2007/0192910 A1* | 8/2007 | Vu | .......................... | B25J 5/007 700/245 |
| 2011/0264305 A1* | 10/2011 | Choe | .................... | G05D 1/0246 701/2 |
| 2013/0232717 A1* | 9/2013 | Lee | ...................... | G05D 1/0255 15/319 |
| 2013/0326839 A1* | 12/2013 | Cho | ....................... | A47L 9/2805 15/319 |
| 2014/0116469 A1* | 5/2014 | Kim | ...................... | A47L 9/2894 134/18 |
| 2014/0214205 A1* | 7/2014 | Kwon | ................... | A47L 9/2826 700/258 |
| 2014/0288709 A1* | 9/2014 | Sim | ...................... | G05D 1/0225 700/259 |
| 2015/0094879 A1* | 4/2015 | Pari | ...................... | G05D 1/0276 701/2 |
| 2015/0197012 A1* | 7/2015 | Schnittman | .......... | G05D 1/0227 700/250 |
| 2015/0220086 A1* | 8/2015 | Willgert | ............... | G05D 1/0214 701/26 |
| 2016/0007817 A1* | 1/2016 | Schlischka | .......... | A47L 11/4061 280/5.514 |
| 2016/0022107 A1* | 1/2016 | Kim | ......................... | G06T 7/97 700/253 |

* cited by examiner

INTERFERENCE SYSTEM AND COMPUTER SYSTEM THEREOF FOR ROBOT CLEANER

BACKGROUND OF THE INVENTION

1. Field of the Invention

The present invention relates to an interference system and computer system thereof for a robot cleaner, and more particularly, to an interference system and computer system thereof utilizing an interference module to change a moving direction of a robot cleaner.

2. Description of the Prior Art

An operational principle of the commercial robot cleaner is that the robot cleaner radiates an ultra sound wave signal and correspondingly receives a feedback signal of the ultra sound wave signal to be reflected by surrounding environmental objects/obstructions neighboring the robot cleaner, such that the robot cleaner can determine a moving direction to finish a cleaning. According to different users' requirements or power storage capacities of the robot cleaner, the robot cleaner may install different operational logic programs/algorithms to render a variety of cleaning services, so as to fit different environmental requirements.

However, the above operation of the commercial robot cleaner only provides a passive cleaning operation. If the robot cleaner has a limiting selection of the operational logic programs/algorithms and the robot cleaner is located within an environment including lots of obstructions, a range and a corresponding efficiency of the cleaning services of the robot cleaner is restricted. Once the user wants to finish the cleaning of a particular zone, the operational programs/algorithms of the commercial robot cleaner may not be dynamically adjusted to fit different environmental requirements, which may result in a less flexibility of the moving direction of the robot cleaner.

Therefore, it has been an important issue to provide an interference system and computer system thereof utilizing an interference module to change a moving direction of a robot cleaner, so as to meet different requirements of the users or different object dispositions of the environment.

SUMMARY OF THE INVENTION

It is an objective to provide an interference system and computer system thereof utilizing an interference module to change a moving direction of a robot cleaner, so as to meet different requirements of the users or different object dispositions of the environment.

The present invention discloses an interference system for a robot cleaner, which generates a detection signal and receives a feedback signal corresponding to the detection signal. The interference system comprises a fixing module, for stably fixing the interference system onto the robot cleaner; a monitor module, for obtaining a real-time imaging information of the robot cleaner; a transmission module, for transmitting the real-time imaging information to a computer system and correspondingly receiving a control signal from the computer system; and an interference module, coupled to the fixing module, for reflecting the detection signal to be the feedback signal according to the control signal, so as to process an interference operation to change a moving direction of the robot cleaner.

The present invention also discloses a computer system coupled to an interference system which utilizes a fixing module for stably fixing onto a robot cleaner, the robot cleaner generates a detection signal and receives a feedback signal corresponding to the detection signal. The computer system comprises a central processing unit; and a storage device, coupled to the central processing unit and storing a programming code, the programming code is utilized to process an interference method. The interference method comprises obtaining a real-time imaging information of the robot cleaner; generating, via the computer system, a control signal according to the real-time imaging information; and utilizing an interference module to reflect the detection signal to be the feedback signal according to the control signal, so as to process an interference operation to change a moving direction of the robot cleaner.

These and other objectives of the present invention will no doubt become obvious to those of ordinary skill in the art after reading the following detailed description of the preferred embodiment that is illustrated in the various figures and drawings.

DETAILED DESCRIPTION

The specification and the claims of the present invention may use a particular word to indicate an element, which may have diversified names named by distinct manufacturers. The present invention distinguishes the element depending on its function rather than its name. The phrase "comprising" used in the specification and the claim is to mean "is inclusive or open-ended but not exclude additional, un-recited elements or method steps." In addition, the phrase "electrically connected to" or "coupled" is to mean any electrical connection in a direct manner or an indirect manner. Therefore, the description of "a first device electrically connected or coupled to a second device" is to mean that the first device is connected to the second device directly or by means of connecting through other devices or methods in an indirect manner.

Figure 1:
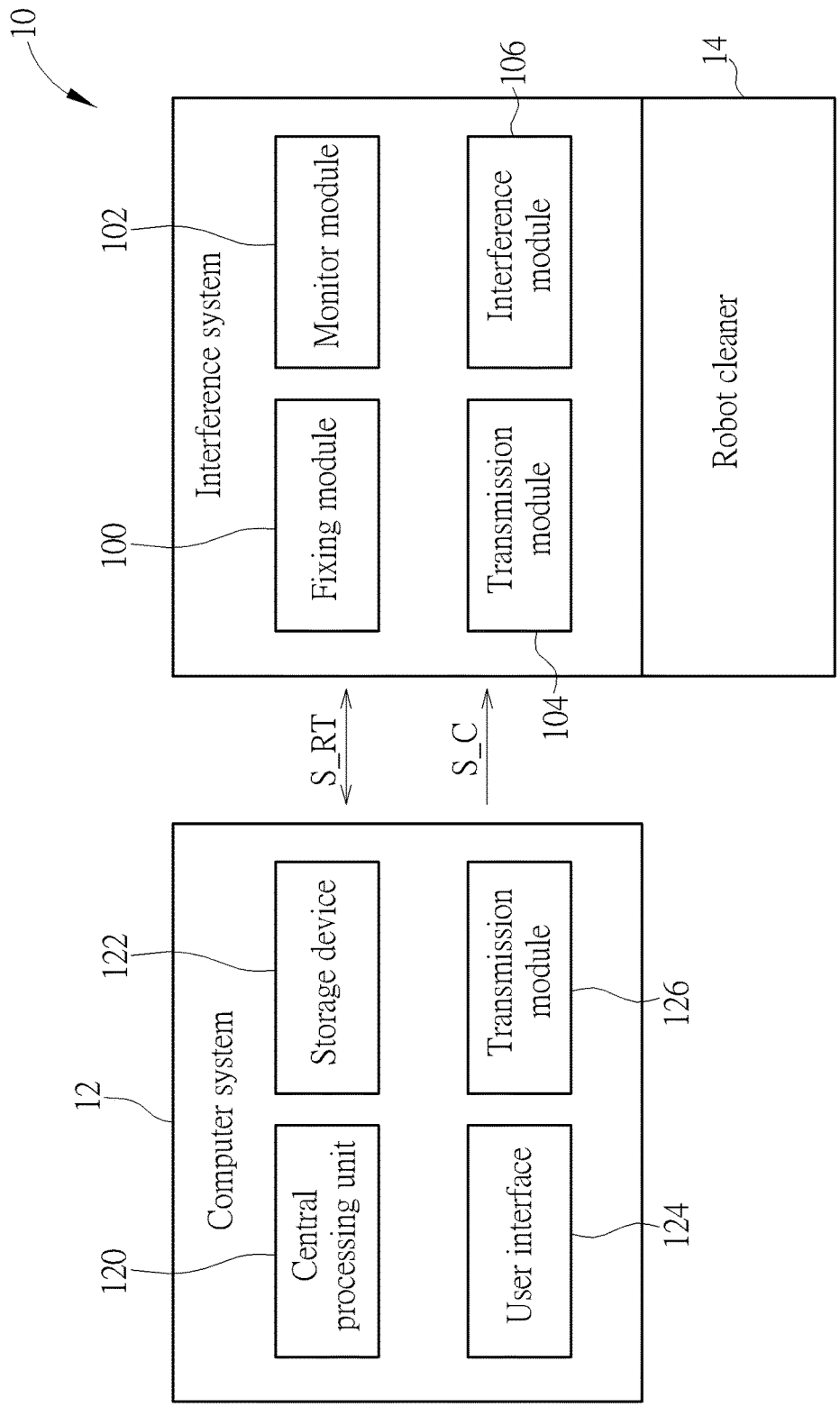
FIG. 1 illustrates a schematic diagram of an interference system coupled to a computer system according to an embodiment of the invention.

FIG. 1 illustrates a schematic diagram of an interference system 10 coupled to a computer system 12 according to an embodiment of the invention. The interference system 10 is coupled to a robot cleaner 14 to process an interference operation of the robot cleaner 14. The robot cleaner 14 can be the commercial automatic cleaner, and the operational principle thereof is understood that a signal transceiver unit of the robot cleaner 14 radiates a detection signal and more than one obstructions are disposed in the environment of the robot cleaner 14 to block/interfere a transmission path of the detection signal, such that the detection signal at different directions/periods can be reflected by the obstructions to be a feedback signal. Accordingly, a control unit of the robot cleaner 14 refers to the feedback signal at different directions/periods to cooperate with an installed operational program/algorithm in a storage unit, so as to determine a moving direction of the robot cleaner 14 for preventing the robot cleaner 14 from being blocked to fail a cleaning service.

Besides, the computer system 12 of the embodiment has a basic structure comprising a main board, a processing unit, a memory, a hard disk, a south-bridge module, a north-bridge module, and etc., and should be well known to those skilled in the art. For the brevity, FIG. 1 of the invention only illustrates a central processing unit 120, a storage device 122, a user interface 124 and a transmission module 126 of the computer system 12. The storage device 122 can be, but not limited to, read-only memory (ROM), random-access memory (RAM), flash, floppy disk, hardware disk, compact disc, USB flash drive, tape, database accessed via the Internet, or other types of storage medium known to those skilled in the art, to store a programming code, such that the central processing unit 120 can be utilized to process the programming code to operate an interference method for the interference system 10 and the robot cleaner 14. Also, the transmission module 126 can be utilized to receive a real-time imaging information S_RT of the robot cleaner 14. The user interface 124 can be utilized to monitor the real-time imaging information S_RT, and a user can utilize the user interface 124 to correspondingly generate a control signal S_C for processing the interference operation.

Please refer to FIG. 1 again. For brief explanation, FIG. 1 only demonstrates few blocks to represent composition units/modules of the interference system 10, and detailed connections or realizations of the composition units/modules of the interference system 10 may be presented in the following paragraphs and figures. In the embodiment, the interference system 10 comprises a fixing module 100, a monitor module 102, a transmission module 104 and an interference module 106. In simple, the fixing module 100 is utilized for stably fixing the interference system 10 onto the robot cleaner 14, such that the robot cleaner 14 is coupled to the interference system 10 to form an integrated cleaner while functionally moving. The monitor module 102 is utilized to obtain the real-time imaging information S_RT of an environment where the robot cleaner 14 is disposed. In other words, while the robot cleaner 14 moves, the monitor module 102 of the embodiment can be utilized to dynamically monitor the surrounding environment. The transmission module 104 can be utilized to transmit the real-time imaging information S_RT to the transmission module 126 of the computer system 12. Also, the transmission module 104 can be utilized to receive the control signal S_C generated by the user interface 124. The interference module 106 is fixed to the fixing module 100, and the control signal S_C generated by the user interface 124 can determine whether an artificial way is processed by the interference module 106 to reflect the detection signal to be the feedback signal, so as to process the interference operation for changing the moving direction of the robot cleaner.

Figure 2:
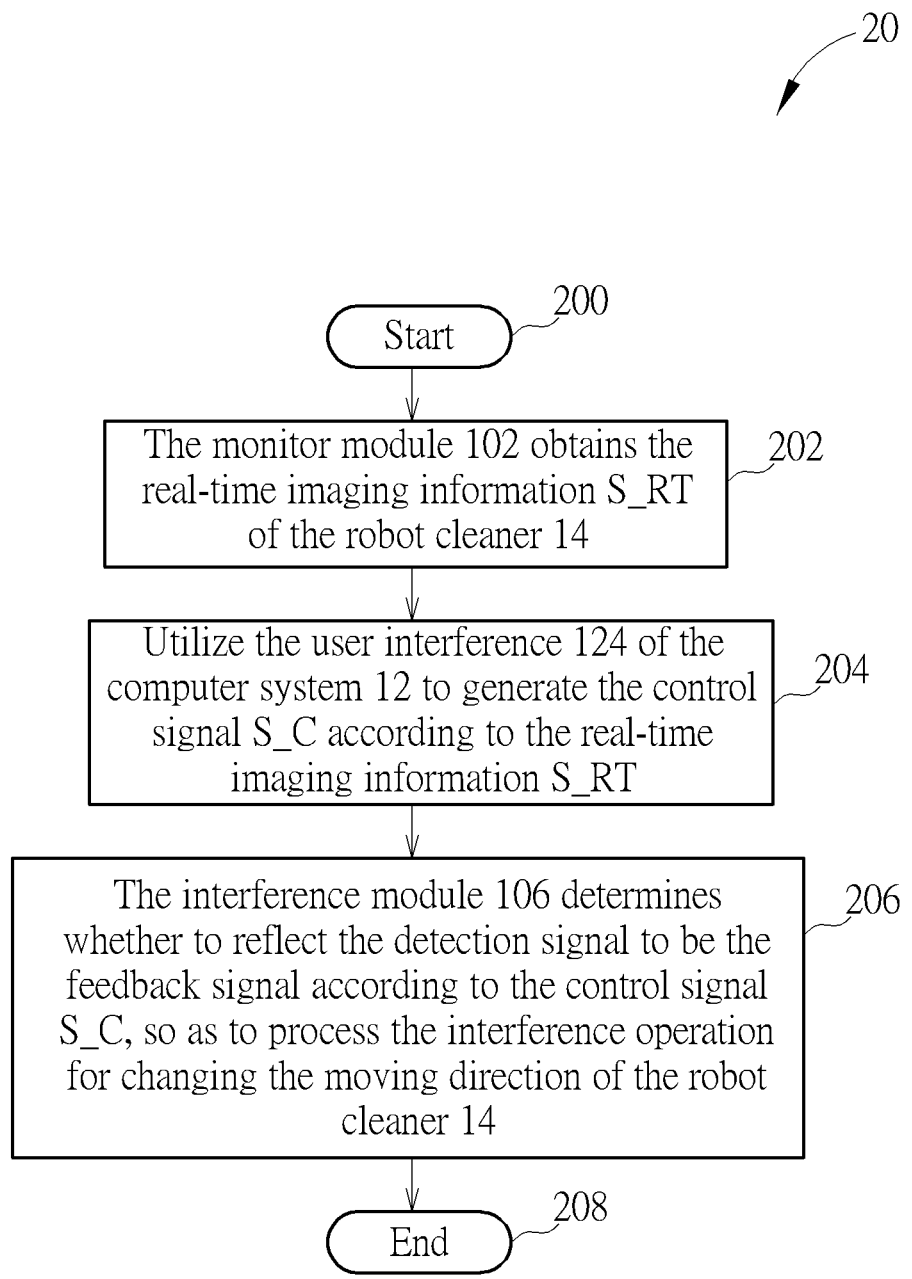
FIG. 2 illustrates a flow chart of an interference process according to an embodiment of the invention.

Furthermore, the interference method of the interference system 10 and the robot cleaner 14 of the invention can be summarized as an interference process 20, as shown in FIG. 2, to be stored in the storage device 122. The interference process 20 includes the following steps:

Step 200: Start.

Step 202: The monitor module 102 obtains the real-time imaging information S_RT of the robot cleaner 14.

Step 204: Utilize the user interface 124 of the computer system 12 to generate the control signal S_C according to the real-time imaging information S_RT.

Step 206: The interference module 106 determines whether to reflect the detection signal to be the feedback signal according to the control signal S_C, so as to process the interference operation for changing the moving direction of the robot cleaner 14.

Step 208: End.

According to the interference process 20, in step 202, the interference system 10 utilizes the monitor module 102 to dynamically obtain the real-time imaging information S_RT, so as to display the real-time imaging information S_RT on the user interface 124.

In step 204, the user refers to the real-time imaging information S_RT on the user interface 124 and utilizes the user interface 124 to generate the control signal S_C. In the embodiment, the user can also utilize a monitoring-direction button of the user interface 124 to correspondingly adjust a shooting direction of a camera of the monitor module 102, so as to obtain a surrounding environmental picture requested by the user as the real-time imaging information S_RT. When the user watches/monitors the real-time imaging information S_RT and realizes that there is one particular zone lacking of cleaning or the robot cleaner 14 has been blocked by a surrounding obstruction, the user can utilize a moving-direction button of the user interface 124 to correspondingly generate a moving command (i.e. the control signal S_C), so as to adjust the moving direction of the robot cleaner 14.

In step 206, the interference module 106 determines whether to reflect the detection signal to be the feedback signal according to the control signal S_C, so as to process the interference operation for changing the moving direction of the robot cleaner 14. In other words, the control signal S_C generated by the user interface 124 can correspondingly control the interference module 106 to process the interference operation, so as to interfere or influence the reception of the feedback signal for the robot cleaner 14 at different directions/periods, which means that the robot cleaner 14 of the embodiment can be operated in an artificial adjustment mechanism for dynamically change the moving direction.

In short, the interference process 20 of the embodiment provides the user with a relative position of the robot cleaner 14, which is obtained by analyzing the real-time imaging information S_RT to obtain a spatial disposition of the robot cleaner 14, in an environment, such that the interference operation can be adaptively processed to influence/interfere the generation of the feedback signal for the robot cleaner 14, so as to dynamically change the moving direction of the robot cleaner 14. In comparison, the prior art only provides a passive operation/mechanism for the robot cleaner 14 to refer to the feedback signal as well as the installed operational logic programs/algorithms for changing the moving direction of the robot cleaner 14. However, the embodiment of the invention renders another active solution to dynamically adjust the moving direction of the robot cleaner 14, so as to greatly improve the application and cleaning efficiency of the robot cleaner 14.

In detail, the interference operation of the embodiment can be realized to adjust/change relative positions of a plurality of obstruction units of the interference module, so as to reflect the detection signal and form the feedback signal at particular directions/periods. When the detection signal transmitted at one particular direction is reflected by the obstruction unit (and a feedback period for generating the feedback signal is smaller than a predetermined period), the robot cleaner 14 can actively determine that there is at least one obstruction disposed at the particular direction, such that the robot cleaner 14 may change the moving direction to another direction being opposed to the particular direction. When the detection signal transmitted at one particular direction is not reflected by any obstruction unit (or a feedback signal is generated and a corresponding feedback period is longer than the predetermined period), the robot cleaner 14 can actively determine that there is no obstruction disposed on the particular direction, such that the robot cleaner 14 may continuously choose the particular direction for moving at the next period. In short, the plurality of obstruction units of the interference module 106 may be controlled by the control signal S_C to correspondingly change the relative positions thereof, so as to reflect/influence the detection signal and form the feedback signal at particular directions/periods. Accordingly, a simulation of an existing obstruction may be generated at the particular direction, and the robot cleaner 14 can be remotely controlled to move into any one particular direction, so as to finish the cleaning service.

Figure 3:
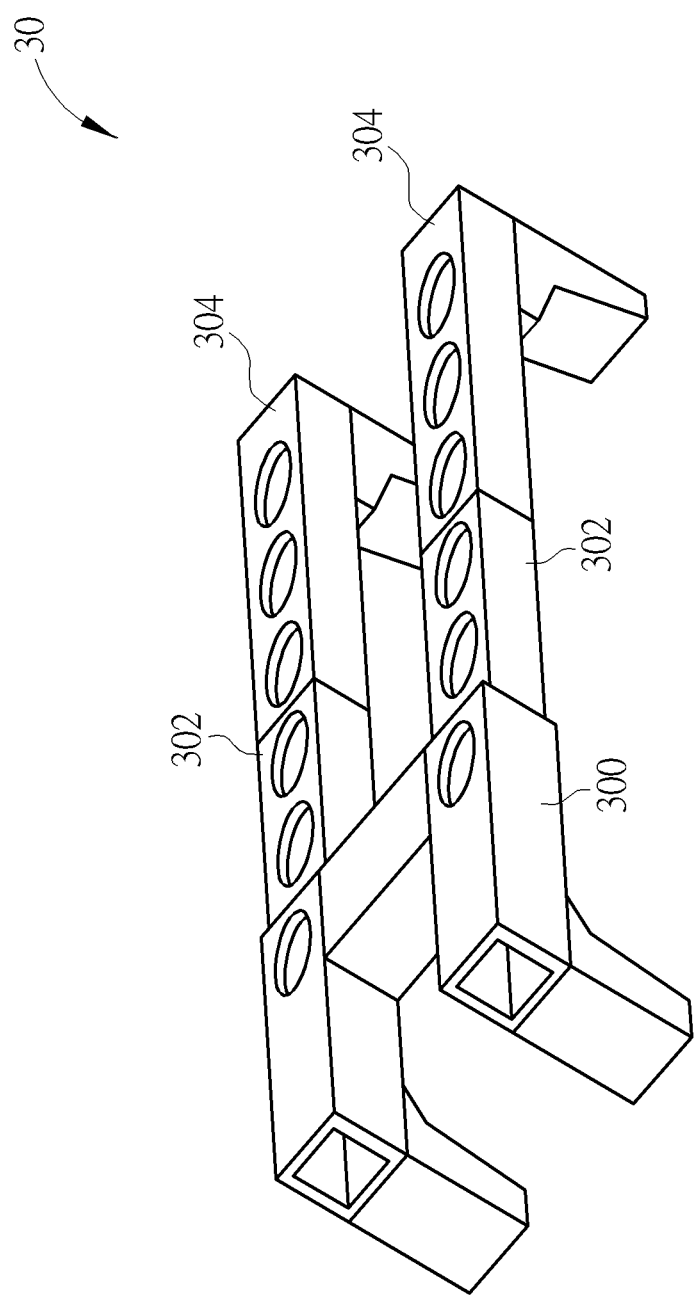
FIG. 3 illustrates a schematic diagram of an extension holder of a fixing module according to an embodiment of the invention.
Figure 4:
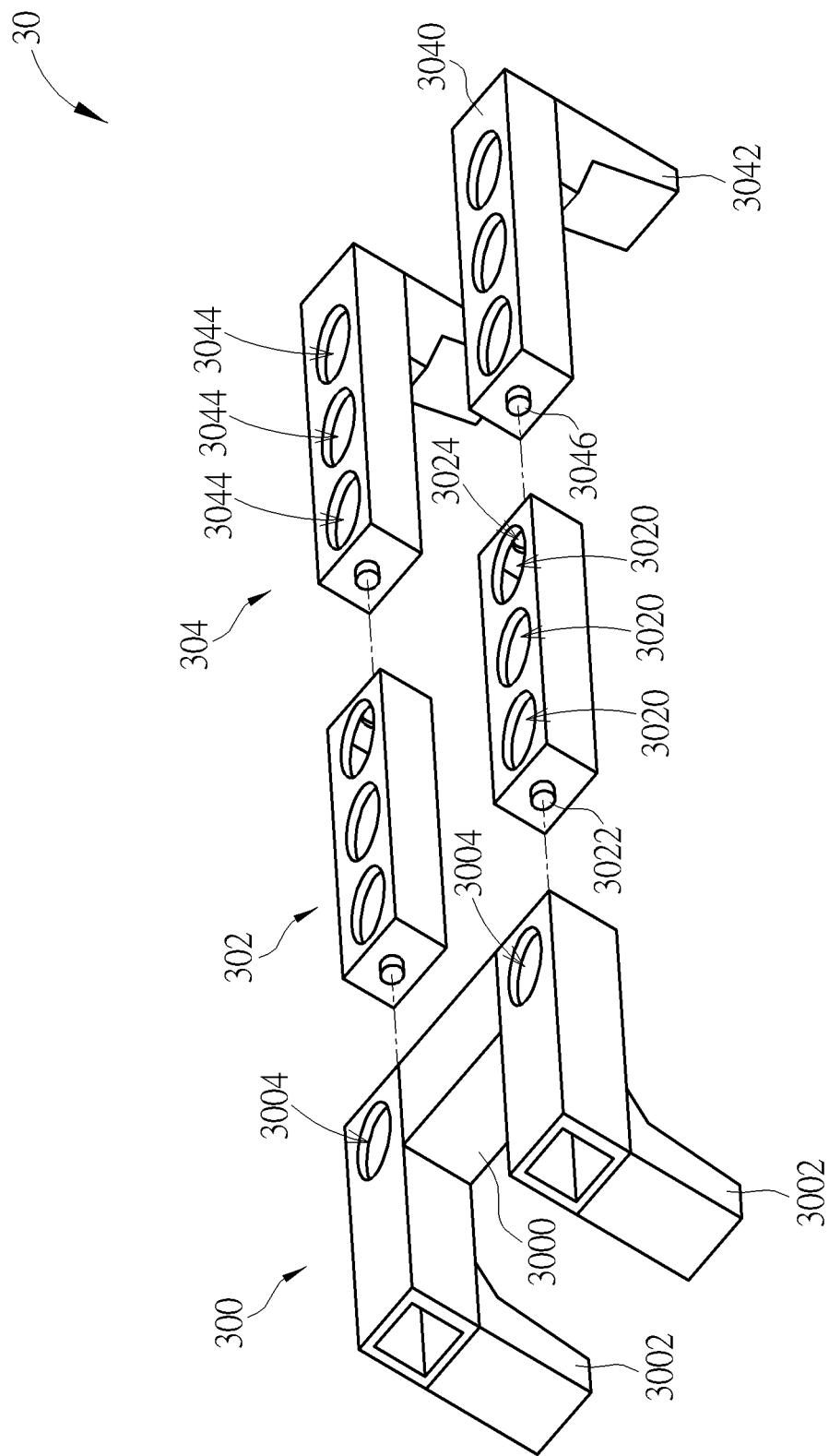
FIG. 4 illustrates an explosively schematic diagram of an extension holder shown in FIG. 3 according to an embodiment of the invention.
Figure 5:
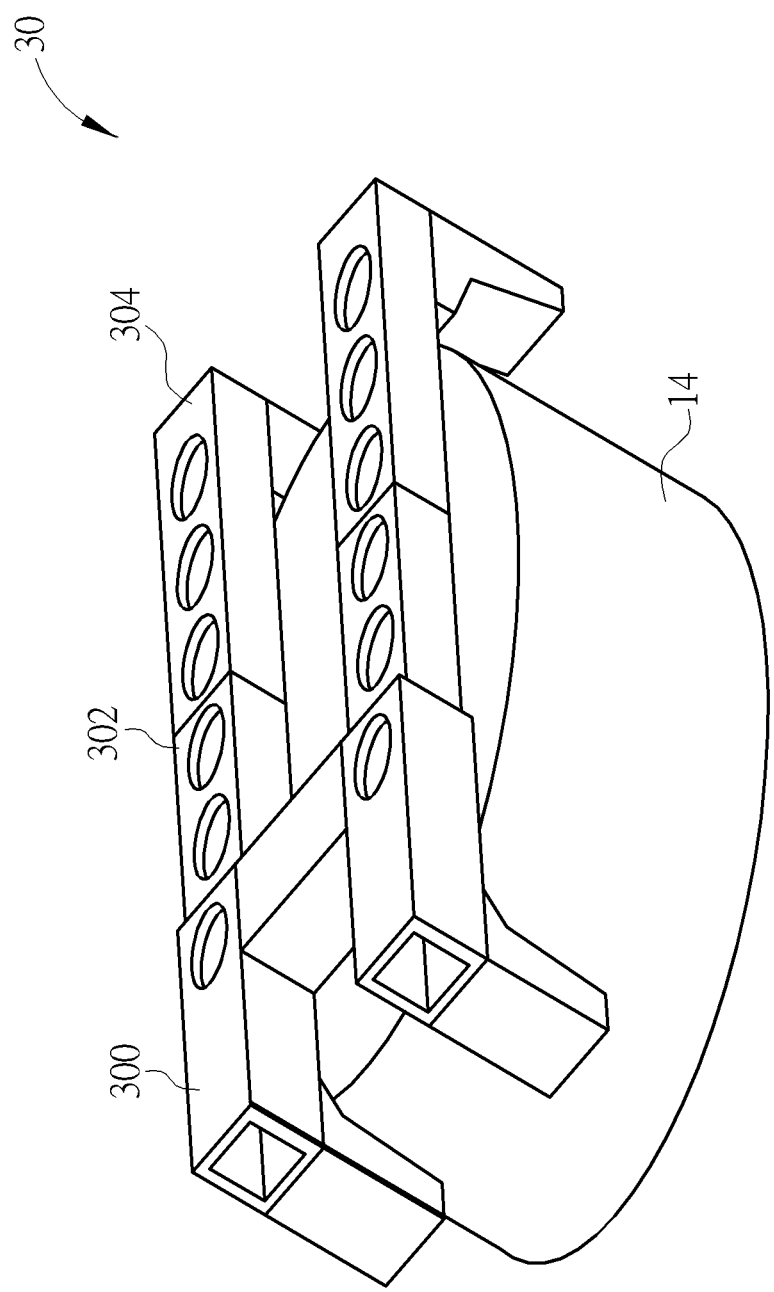
FIG. 5 illustrates a combination diagram of an extension holder shown in FIG. 3 and a robot cleaner according to an embodiment of the invention.
Figure 6:
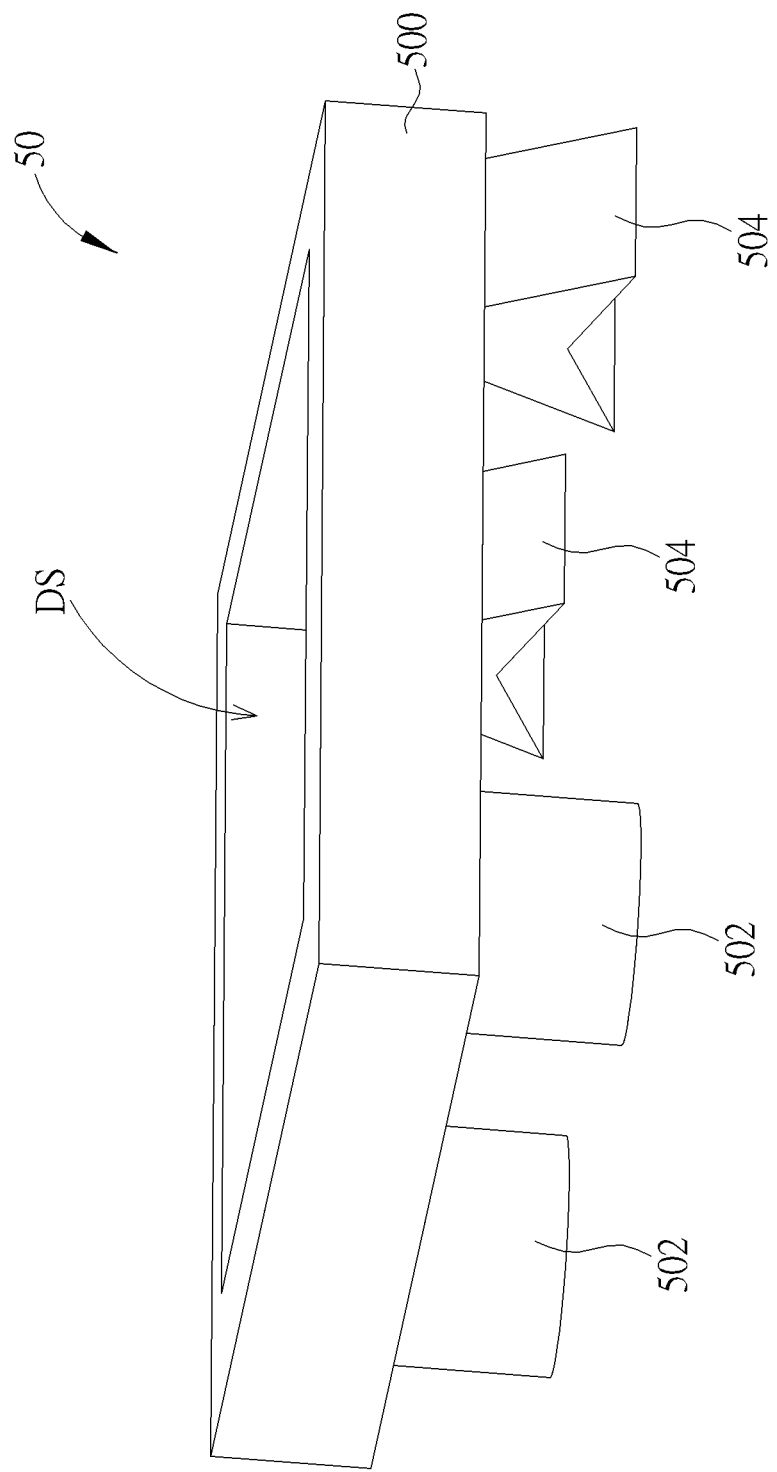
FIG. 6 illustrates a schematic diagram of a base of a fixing module according to an embodiment of the invention.

Please refer to FIG. 3 to FIG. 6, wherein FIG. 3 illustrates a schematic diagram of an extension holder 30 of the fixing module 100 according to an embodiment of the invention, FIG. 4 illustrates an explosively schematic diagram of the extension holder 30 in FIG. 3 according to an embodiment of the invention, FIG. 5 illustrates a combination diagram of the extension holder 30 in FIG. 3 and the robot cleaner 14 according to an embodiment of the invention, and FIG. 6 illustrates a schematic diagram of a base 50 of the fixing module 100 according to an embodiment of the invention. As shown in FIG. 3 and FIG. 4, the extension holder 30 of the embodiment can be explosively divided into a first holder 300, an extension unit 302 and a second holder 304. In detail, the first holder 300 comprises a main body 3000 being as a frame shape, two terminals of the main body 3000 are vertically coupled to a corner holder 3002, and the main body 3000 also comprises two cavities 3004. The extension unit 302 is utilized to connect the first holder 300 and the second holder 304, and a main body of the extension unit 302 comprises a plurality of cavities 3020 and each terminal of the main body comprises a convex unit 3022 and a concave unit 3024. The second holder 304 comprises a main body 3040 and a corner holder 3042 both connecting together, and the main body 3040 comprises a plurality of cavities 3044 and one terminal of the main body 3040 comprises a convex unit 3046.

Accordingly, the corner holder 3002 of the first holder 300 and the corner holder 3042 of the second holder 304 are utilized to stably grab an external structure of the robot cleaner 14, such that the fixing module 100 can be stably fixed onto the robot cleaner 14, wherein the detailed diagram is shown in FIG. 5 to understand the connection between extension holder 30 and the robot cleaner 14. Further, considering different sizes of the robot cleaner 14, the extension unit 302 can be utilized to extend a grabbing space between the first holder 300 and the second holder 304. The convex unit 3022 of the extension unit 302 can be utilized to connect to a corresponding concave unit (not shown in the figure) of the first holder 300, and the convex unit 3046 of the second holder 304 can be utilized to connect to the concave unit 3024 of the extension unit 302, such that the extension unit 302 is coupled between the first holder 300 and the second holder 304.

Please refer to FIG. 6, the base 50 comprises a main body 500, a plurality of connection units 502 and a plurality of slipping-proof units 504. In detail, the main body 500 comprises a container space DS to be utilized for stably fixing the interference module 106 of the invention. Also, the connection units 502 and the skipping-proof units 504 are symmetrically disposed on the main body 500. The connection unit 502 is utilized to stably connect or fix to the cavities 3004 of the first holder 300, the concave unit 3024 of the extension unit 302 and/or the cavities 3044 of the second holder 304. Besides, the extension unit 302 of the embodiment can be adaptively extended/shorten to render a flexible connection for fitting different sizes of the base 50, which is not limiting the scope of the invention. The slipping-proof units 504 can be an extension unit to be coupled to the second holder 304, so as to prevent a slide between the extension holder 30 and the base 50.

Figure 7:
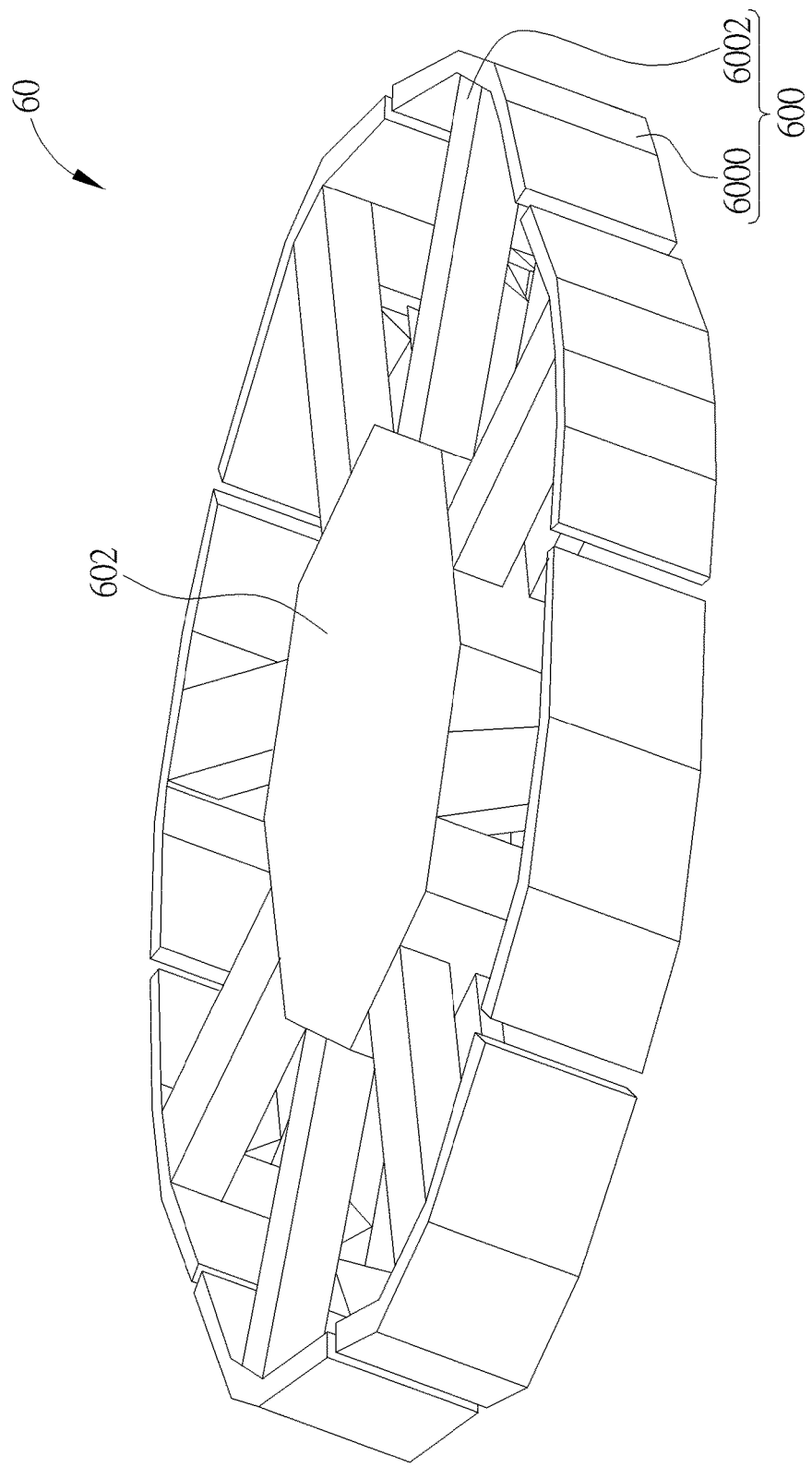
FIG. 7 and FIG. 8 illustrate schematic diagrams of an interference module according to an embodiment of the invention.

Please refer to FIG. 7, which illustrates a schematic diagram of an interference module 60 according to an embodiment of the invention. As shown in FIG. 7, the interference module 60 comprises a plurality of holder units 600 and a control unit 602. Each holder unit 600 is coupled to the control unit 602. Each holder unit 600 comprises an obstruction unit 6000 and a connection unit 6002 both connecting together. The control unit 602 of the interference module 60 is disposed in the container space DS of the base 50 in FIG. 5 for stably connecting. Also, the obstruction units 6000 of the embodiment can be adaptively utilized to interfere/reflect the detection signal transmitted by the robot cleaner 14, so as to complete the interference operation of the embodiment.

Figure 8:
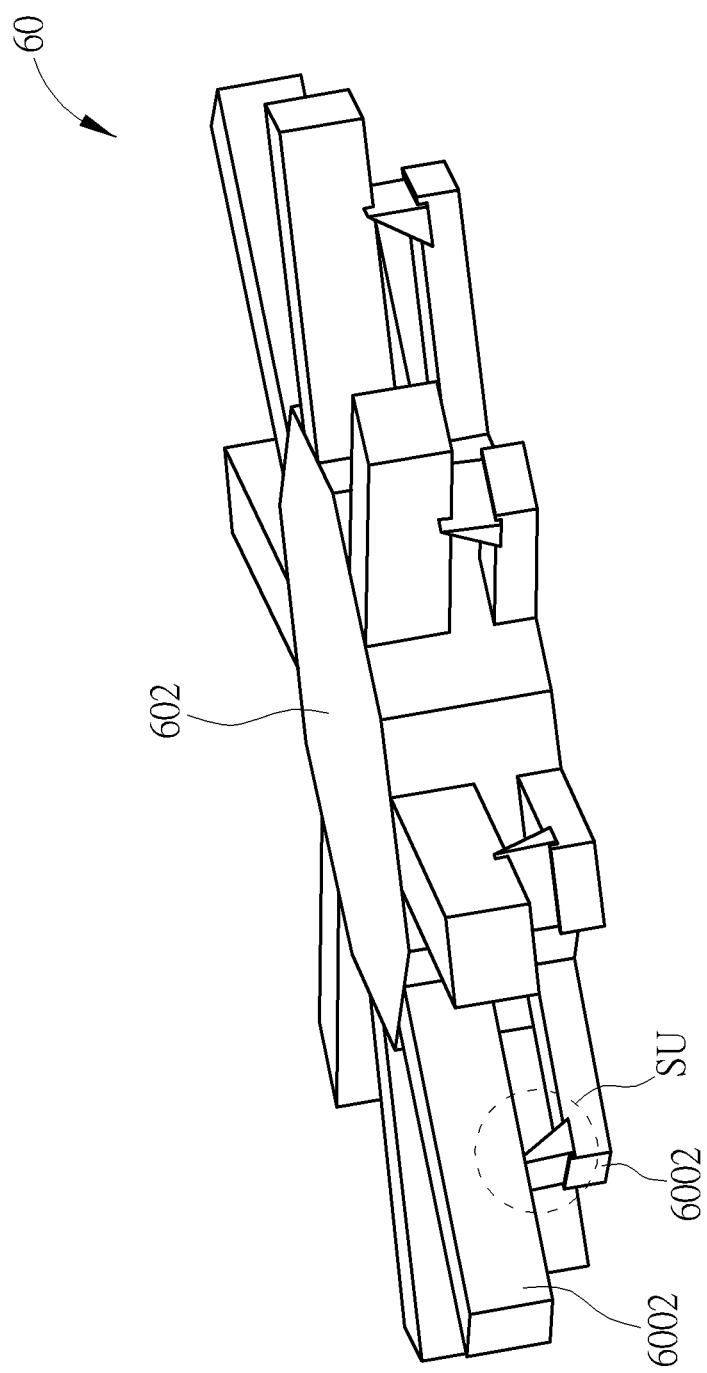
Figure 9:
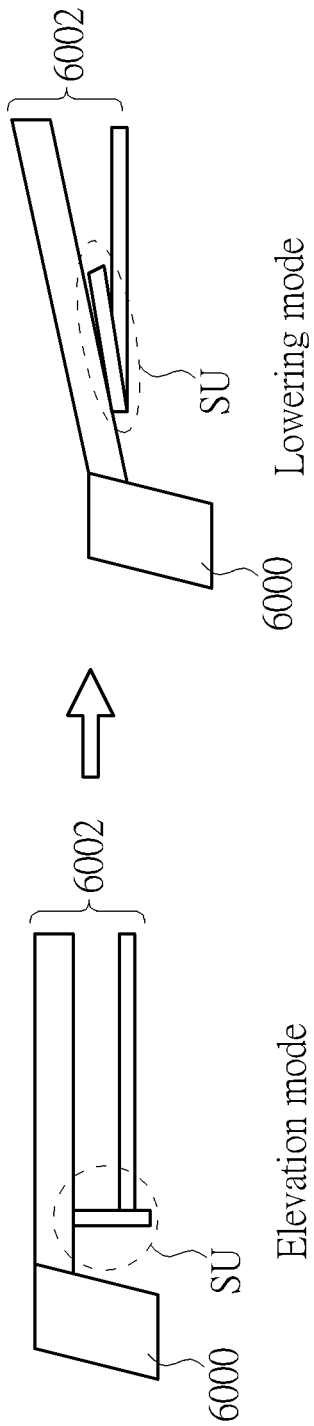
FIG. 9 illustrates a detailed operational diagram of an interference module shown in FIG. 7 or FIG. 8 according to an embodiment of the invention.

Please refer to FIG. 8 and FIG. 9, wherein FIG. 8 illustrates a detailed schematic diagram of the interference module 60 shown in FIG. 7 according to an embodiment of the invention, and FIG. 9 illustrates a detailed operational diagram of the interference module shown in FIG. 7 or FIG. 8 according to an embodiment of the invention. Also, FIG. 9 comprises an elevation mode and a lowering mode of the interference module 60. As shown in FIG. 8 and FIG. 9, each connection unit 6002 further comprises a holder unit SU to be correspondingly elevated or lowered for processing the elevation mode or the lowering mode according to the control signal S_C generated by the user interface 124. When the interference module 60 processes the elevation mode, one connection unit 6002 at one particular direction can elevate a relative position of the obstruction unit 6000, such that the obstruction unit 6000 is not disposed on a transmission path of the detection signal or the feedback signal and the robot cleaner 14 may only refer to the feedback signal reflected by the environment. When the interference module 60 processes the lowering mode, one connection unit 6002 at one particular direction can lower a relative position of the obstruction unit 6000, such that the obstruction unit 6000 is disposed on a transmission path of the detection signal or the feedback signal and the robot cleaner 14 may correspondingly refer to the feedback signal reflected by the obstruction unit 6000. Accordingly, the embodiment of the invention can adaptively set a plurality of moving directions for the robot cleaner 14, such that the plurality of obstruction units may be disposed on the plurality of moving directions of the robot cleaner 14. By elevating or lowering the obstruction units 6000, the detection signal generated by the robot cleaner 14 may be correspondingly reflected at different periods, which contributes the determination of the moving direction for the robot cleaner 14.

Figure 10:
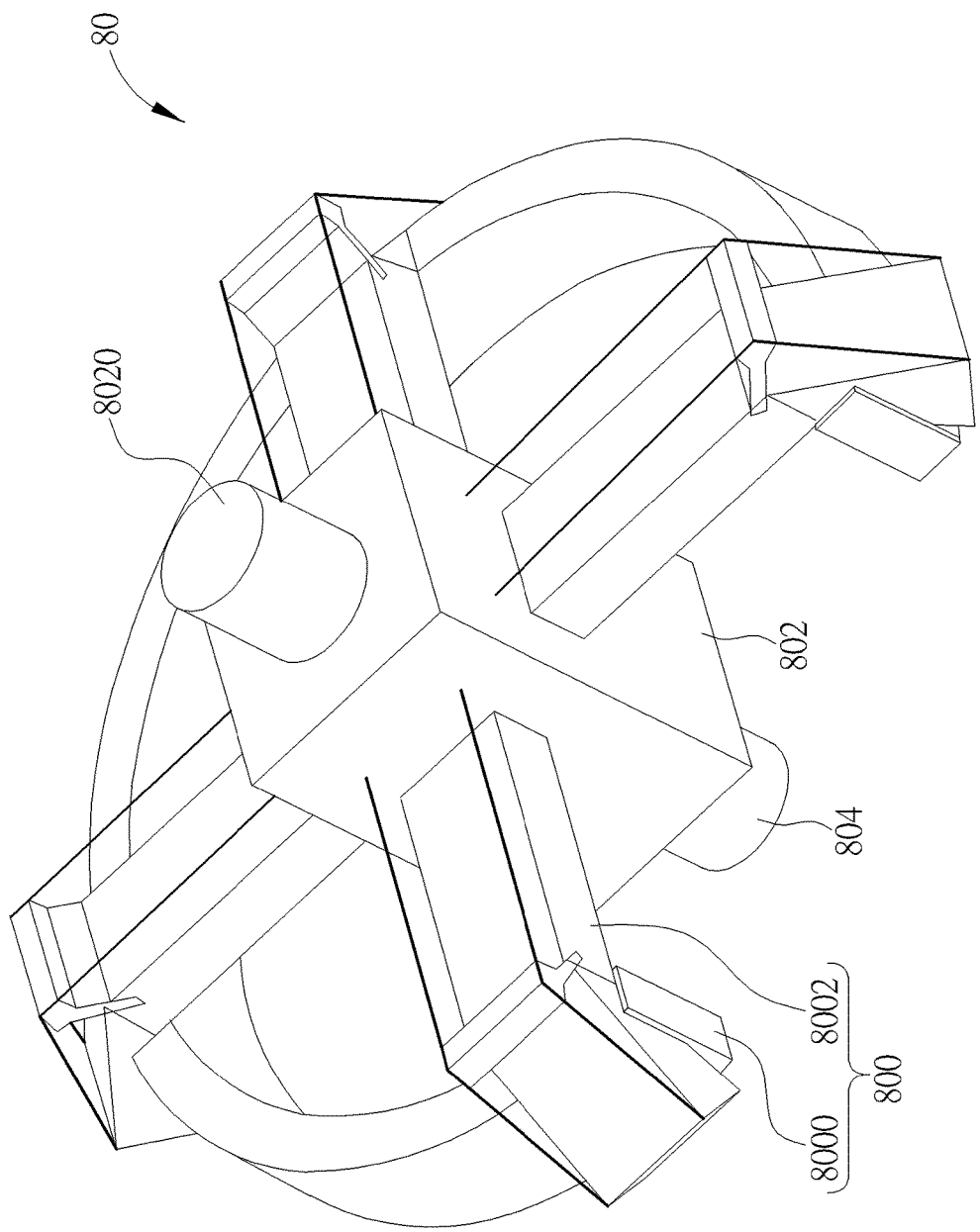
FIG. 10 illustrates a schematic diagram of another interference module according to an embodiment of the invention.

Please refer to FIG. 10, which illustrates a schematic diagram of another interference module 80 according to an embodiment of the invention. As shown in FIG. 10, the interference module 80 comprises a plurality of holder units 800, a control unit 802 and a rotation unit 804. Each holder unit 800 is coupled to the control unit 802 and comprises an obstruction unit 8000 and a connection unit 8002 both connecting together. Preferably, the obstruction units 8000 of the embodiment form a shield ring (or a shield cover), and may be disposed on the transmission path of the detection signal to interfere or reflect the detection signal. In comparison, the obstruction units shown in FIG. 7 completely interfere or obstruct the detection signal generated by the robot cleaner 14, and shield ring realized by the plurality of obstruction units 8000 of the interference module 80 further comprises a gap, such that the gap makes the detection signal and the feedback signal freely pass through the gap without obstruction. Also, the rotation unit 804 can adaptively adjust a rotation angle of the interference module 80 to change a relative position of the gap associated with the obstruction units 8000, such that the obstruction units 8000 can be adaptively disposed to interfere or reflect the detection signal generated by the robot cleaner 14, so as to finish the interference operation of the invention. Similarly, the obstruction units 8000 of the interference module 80 can also utilize a control line to connect to a line-collector unit 8020 of the control unit 802, and the line-arrangement unit 8020 can process a rotation operation to adaptively control a relative length of the control line connecting to each obstruction unit, so as to correspondingly elevate or lower the relative position of the obstruction unit 8000 for interfering/reflecting the detection signal generated by the robot cleaner 14. The control unit 802 and the rotation unit 804 of the interference module 80 can be disposed in the container space DS of the base 50 shown in FIG. 5 to form the connection thereof.

Noticeably, being similar with the elevation mode or the lowering mode of the interference module 60, the interference module 80 can not only utilize the line-collector 8020 and the control line to correspondingly elevate or lower the relative position of each obstruction unit 8000, but also process the rotation operation to control arrangement angles of the plurality of the obstruction units 8000. In other words, the interference module 80 renders two operations to reflect/interfere the detection signal, and the obstruction units 8000 of the embodiment are disposed on the moving directions of the detection signal/feedback signal to cooperate the rotation operation of the rotation unit 804 (i.e. different rotation angles). Accordingly, the detection signal generated by the robot cleaner 14 can be reflected under the operation of interference module 80 at different periods/directions, so as to make the robot cleaner 14 determine the moving direction thereof. Certainly, the structural formation of the interference module 80 of the embodiment can also be adaptively adjusted or modified to fit different sizes of the robot cleaner 14, so as to elevate the application of the interference module of the embodiment, which is not limiting the scope of the invention.

Preferably, the detection signal generated by the robot cleaner 14 of the embodiment can be realized as an audio signal, e.g. a ultra sound wave signal, or a light source signal, e.g. an infra-red ray. Accordingly, the robot cleaner 14 can cooperate with different types of transceiver units to correspondingly transmit/receive different types of detection/feedback signals, which is not limiting the scope of the invention. Further, for effectively interfering or reflecting the detection signal generated by the robot cleaner 14, the obstruction unit of the embodiment can be a dark-color board, a metal panel or a non-transparent acrylic sheet to render different types of reflection surfaces for reflecting the audio signal or the light source signal, which is also within the scope of the invention.

Certainly, those skilled in the art can adaptively modify the disposition of the interference module onto the robot cleaner. For example, the interference module can be directly integrated with an upper surface of the robot cleaner, i.e. the interference module and the robot cleaner are united together. Also, the robot cleaner can install the monitor module and the transmission module, which means that the fixing module of the embodiment can be omitted. Under such circumstances, the obstruction unit can be operated to synchronize with the transmission of the detection signal or the reception of the feedback signal. Certainly, during the synchronization, more adaptive blocking boards or films can be utilized to directly attach/dispose onto the transmission path of the detection/feedback signal, so as to simplify operations or structural formations of the obstruction units, which is also within the scope of the invention.

In summary, the embodiments of the invention provide an interference method and system for a robot cleaner. By immediately obtaining the real-time imaging information of the robot cleaner and direct instructions of the moving directions from the user, the plurality of obstruction units of the interference system can directly move straightforward or rotate with adaptive angles to interfere or influence the robot cleaner radiating the detection signal or receiving the feedback signal, so as to make the robot cleaner determine which obstructions can be utilized to block/interfere movements of the robot cleaner (i.e. comparing the reception of the feedback signal at different periods/directions to determine which directions are disposed the obstructions). Accordingly the embodiment of the invention can artificially adjust the moving direction of the robot cleaner to enlarge the available cleaning zone of the robot cleaner, so as to comply with different requirements of the user or conditions/dispositions of the surrounding environment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interference system for a robot cleaner, which generates a detection signal and receives a feedback signal corresponding to the detection signal, the interference system comprising:
   a fixing module, coupled to the robot cleaner, configured to stably fix the interference system onto the robot cleaner;
   a monitor module, configured to obtain a real-time imaging information of the robot cleaner;
   a transmission module, coupled to the monitor module, configured to transmit the real-time imaging information to a computer system and correspondingly receive a control signal from the computer system; and
   an interference module, coupled to the fixing module and the transmission module, configured to determine whether to perform an interference operation according to the control signal, such that a moving direction of the robot cleaner is changed by performing the interference operation;

wherein the interference operation is to reflect the detection signal to be the feedback signal.

2. The interference system of claim 1, wherein the fixing module further comprises:
an extension holder, configured to stably fix the interference system onto the robot cleaner; and
a base, comprising a connection unit coupled to the extension holder and a container space, configured to stably fix the interference module.

3. The interference system of claim 1, wherein the interference module further comprises:
a plurality of holder units, each holder unit comprising an obstruction unit and a connection unit; and
a control unit, coupled to a plurality of connection units of the plurality of holder units, configured to control an elevation-lowering operation of each obstruction unit to adjust a relative position of each obstruction unit of the interference module, so as to determine whether or not to reflect the detection signal for changing the moving direction of the robot cleaner;
wherein the plurality of holder units are circularly disposed onto the control unit, such that the each obstruction unit is operated under a lowering mode to block the detection signal, or is operated under an elevation mode to unblock the detection signal.

4. The interference system of claim 3, wherein the interference module further comprises:
a rotation unit, coupled to the control unit, configured to control a rotation angle of the interference module to adjust the relative positions of the obstruction units of the interference module, so as to determine whether or not to reflect the detection signal for changing the moving direction of the robot cleaner;
wherein the rotation unit is disposed under the control unit to adaptively rotate the control unit and the plurality of holder units, so as to change the rotation angle of the interference module.

5. The interference system of claim 4, wherein the obstruction units form a shield ring or a shield cover, and the shield ring or the shield cover comprises a gap, such that the gap makes the detection signal and the feedback signal freely pass through the gap without obstruction.

6. The interference system of claim 3, wherein the detection signal is a voice signal or a light source signal, and each obstruction unit comprises a reflection surface to reflect the voice signal or the light source signal.

7. The interference system of claim 3, wherein when the interference system determines that the interference operation is not proceeded, the robot cleaner determines the moving direction according to the feedback signal reflected by an environmental object, and the plurality of obstruction units of the interference module are not disposed on a transmission path of the detection signal and the feedback signal.

8. The interference system of claim 1, wherein the computer system further comprises a user interface and a transmission module, the transmission module is utilized to receive the real-time imaging information, and the user interface is utilized to monitor the real-time imaging information to correspondingly generate the control signal for processing the interference operation.

9. A computer system, coupled to an interference system which utilizes a fixing module for stably fixing onto a robot cleaner, the robot cleaner generates a detection signal and receives a feedback signal corresponding to the detection signal, the computer system comprising:
a central processing unit; and
a storage device, coupled to the central processing unit and storing a programming code, the programming code is utilized to process an interference method when executed by the central processing unit, the interference method comprising:
obtaining a real-time imaging information of the robot cleaner; and
generating, via the computer system, a control signal according to the real-time imaging information; and
wherein the interference system is configured to determine whether to perform an interference operation according to the control signal such that a moving direction of the robot cleaner is changed by performing the interference operation;
wherein the interference operation is to reflect the detection signal, by an interference module, to be the feedback signal.

10. The computer system of claim 9, wherein the fixing module further comprises an extension holder configured to stably fix the interference system onto the robot cleaner and a base comprising a container space configured to stably fix the interference module.

11. The computer system of claim 9, wherein the interference module further comprises:
a plurality of holder units, each holder unit comprising an obstruction unit and a connection unit; and
a control unit, coupled to a plurality of connection units of the plurality of holder units, configured to control an elevation-lowering operation of each obstruction unit to adjust a relative position of each obstruction unit of the interference module, so as to determine whether or not to reflect the detection signal for changing the moving direction of the robot cleaner;
wherein the plurality of holder units are circularly disposed onto the control unit, such that the each obstruction unit is operated under a lowering mode to block the detection signal, or is operated under an elevation mode to unblock the detection signal.

12. The computer system of claim 11, wherein the interference module further comprises:
a rotation unit, coupled to the control unit, configured to control a rotation angle of the interference module to adjust the relative positions of the obstruction units of the interference module, so as to determine whether or not to reflect the detection signal for changing the moving direction of the robot cleaner;
wherein the rotation unit is disposed under the control unit to adaptively rotate the control unit and the plurality of holder units, so as to change the rotation angle of the interference module.

13. The computer system of claim 12, wherein the obstruction units form a shield ring or a shield cover, and the shield ring or the shield cover comprises a gap, such that the gap makes the detection signal and the feedback signal freely pass through the gap without obstruction.

14. The computer system of claim 11, wherein the detection signal is a voice signal or a light source signal, and each obstruction unit comprises a reflection surface to reflect the voice signal or the light source signal.

15. The computer system of claim 11, wherein when the interference system determines that the interference operation is not proceeded, the robot cleaner determines the moving direction according to the feedback signal reflected by an environmental object, and the plurality of obstruction units of the interference module are not disposed on a transmission path of the detection signal and the feedback signal.

16. The computer system of claim 9, further comprising a user interface and a transmission module, the transmission module is utilized to receive the real-time imaging information, and the user interface is utilized to monitor the real-time imaging information to correspondingly generate the control signal for processing the interference operation.

* * * * *